(12) United States Patent  (10) Patent No.: US 7,702,585 B2
Lyda et al.  (45) Date of Patent: Apr. 20, 2010

(54) METHODS AND SYSTEMS FOR THE DETERMINATION AND DISPLAY OF PAYMENT LEAD TIME IN AN ELECTRONIC PAYMENT SYSTEM

(75) Inventors: Paul J. Lyda, Powell, OH (US); Timothy Herdklotz, Banner Elk, NC (US); Donald Kenneth Hobday, Jr., Blacklick, OH (US)

(73) Assignee: CheckFree Corporation, Norcross, GA (US)

( * ) Notice: Subject to any disclaimer, the term of this patent is extended or adjusted under 35 U.S.C. 154(b) by 297 days.

(21) Appl. No.: 11/565,322

(22) Filed: Nov. 30, 2006

(65) Prior Publication Data

US 2008/0133405 A1 Jun. 5, 2008

(51) Int. Cl.
G06Q 40/00 (2006.01)
G06F 17/60 (2006.01)
(52) U.S. Cl. .......................................... 705/40; 705/39
(58) Field of Classification Search .................. 705/39, 705/40, 42
See application file for complete search history.

(56) References Cited

U.S. PATENT DOCUMENTS

| | | |
|---|---|---|
| 3,761,682 A | 9/1973 | Barnes et al. |
| 3,833,885 A | 9/1974 | Gentile et al. |
| 3,876,864 A | 4/1975 | Clark et al. |
| 3,949,364 A | 4/1976 | Clark et al. |
| 4,270,042 A | 5/1981 | Case |
| 4,277,837 A | 7/1981 | Stuckert |
| 4,319,336 A | 3/1982 | Anderson et al. |
| 4,321,672 A | 3/1982 | Braun et al. |
| 4,460,960 A | 7/1984 | Anderson et al. |
| 4,484,328 A | 11/1984 | Schlafly |
| 4,642,767 A | 2/1987 | Lerner |
| 4,649,563 A | 3/1987 | Riskin |
| 4,734,858 A | 3/1988 | Schlafly |
| 4,745,559 A | 5/1988 | Willis et al. |
| 4,758,714 A | 7/1988 | Carlson et al. |
| 4,791,561 A | 12/1988 | Huber |
| 4,799,156 A | 1/1989 | Shavit et al. |

(Continued)

FOREIGN PATENT DOCUMENTS

GB 2294566 5/1996

(Continued)

OTHER PUBLICATIONS

Quicken 2005 for Mac User Guide.*

(Continued)

Primary Examiner—Hani Kazimi
Assistant Examiner—Hao Fu
(74) Attorney, Agent, or Firm—Sutherland Asbill & Brennan LLP

(57) ABSTRACT

A system and method for determining and displaying a payment lead time or expected payment delivery time in an electronic payment system is disclosed. A payee associated with a payor is identified. Prior to receiving a payment request to pay the payee on behalf of the payor, an expected payment delivery time for a payment to fulfill the payment request is determined. The expected payment delivery time is based on at least one payment attribute associated with the payee and at least one payment attribute associated with the payor. An interface screen is then generated for displaying the determined expected payment delivery time.

37 Claims, 6 Drawing Sheets

U.S. PATENT DOCUMENTS

| | | |
|---|---|---|
| 4,823,264 A | 4/1989 | Deming |
| 4,882,675 A | 11/1989 | Nichtberger et al. |
| 4,926,325 A | 5/1990 | Benton et al. |
| 4,929,818 A | 5/1990 | Bradbury et al. |
| 4,947,028 A | 8/1990 | Gorog |
| 4,948,174 A | 8/1990 | Thomson et al. |
| 4,960,981 A | 10/1990 | Benton et al. |
| 4,961,139 A | 10/1990 | Hong et al. |
| 4,974,878 A | 12/1990 | Josephson |
| 5,007,084 A | 4/1991 | Materna et al. |
| 5,025,373 A | 6/1991 | Keyser, Jr. et al. |
| 5,093,787 A | 3/1992 | Simmons |
| 5,097,115 A | 3/1992 | Ogasawara et al. |
| 5,111,395 A | 5/1992 | Smith et al. |
| 5,121,945 A | 6/1992 | Thomson et al. |
| 5,220,501 A | 6/1993 | Lawlor et al. |
| 5,231,571 A | 7/1993 | D'Agostino |
| 5,237,159 A | 8/1993 | Stephens et al. |
| 5,265,008 A | 11/1993 | Benton et al. |
| 5,283,829 A | 2/1994 | Anderson |
| 5,287,270 A | 2/1994 | Hardy et al. |
| 5,290,847 A | 3/1994 | Yukimoto et al. |
| 5,303,149 A | 4/1994 | Janigian |
| 5,325,290 A | 6/1994 | Cauffman et al. |
| 5,326,959 A | 7/1994 | Perazza |
| 5,336,870 A | 8/1994 | Hughes et al. |
| 5,341,429 A | 8/1994 | Stringer et al. |
| 5,347,632 A | 9/1994 | Filepp et al. |
| 5,383,113 A | 1/1995 | Kight et al. |
| 5,420,405 A | 5/1995 | Chasek |
| 5,465,206 A | 11/1995 | Hilt et al. |
| 5,473,143 A | 12/1995 | Vajk et al. |
| 5,483,445 A | 1/1996 | Pickering |
| 5,496,991 A | 3/1996 | Delfer, III et al. |
| 5,504,677 A | 4/1996 | Pollin |
| 5,594,910 A | 1/1997 | Filepp et al. |
| 5,649,117 A | 7/1997 | Landry |
| 5,649,118 A | 7/1997 | Carlisle et al. |
| 5,652,786 A | 7/1997 | Rogers |
| 5,655,089 A | 8/1997 | Bucci |
| 5,677,955 A | 10/1997 | Doggett et al. |
| 5,684,965 A | 11/1997 | Pickering |
| 5,694,551 A | 12/1997 | Doyle et al. |
| 5,696,902 A | 12/1997 | Leclercq et al. |
| 5,699,528 A | 12/1997 | Hogan |
| 5,710,889 A | 1/1998 | Clark et al. |
| 5,724,424 A | 3/1998 | Gifford |
| 5,727,249 A | 3/1998 | Pollin |
| 5,750,972 A | 5/1998 | Botvin |
| 5,794,221 A | 8/1998 | Egendorf |
| 5,815,665 A | 9/1998 | Teper et al. |
| 5,832,460 A | 11/1998 | Bednar et al. |
| 5,873,072 A | 2/1999 | Kight et al. |
| 5,884,288 A | 3/1999 | Chang et al. |
| 5,892,900 A | 4/1999 | Ginter et al. |
| 5,920,847 A | 7/1999 | Kolling et al. |
| 5,920,848 A | 7/1999 | Schutzer et al. |
| 5,930,759 A | 7/1999 | Moore et al. |
| 5,943,656 A | 8/1999 | Crooks et al. |
| 5,956,700 A | 9/1999 | Landry |
| 5,963,925 A | 10/1999 | Kolling et al. |
| 5,966,698 A | 10/1999 | Pollin |
| 5,974,146 A | 10/1999 | Randle et al. |
| 5,978,780 A | 11/1999 | Watson |
| 6,023,684 A | 2/2000 | Pearson |
| 6,029,141 A | 2/2000 | Bezos et al. |
| 6,029,147 A | 2/2000 | Horadan et al. |
| 6,029,150 A | 2/2000 | Kravitz |
| 6,031,625 A | 2/2000 | Sherman et al. |
| 6,032,133 A | 2/2000 | Hilt et al. |
| 6,035,285 A | 3/2000 | Schlect et al. |
| 6,044,362 A | 3/2000 | Neely |
| 6,047,268 A | 4/2000 | Bartoli et al. |
| 6,049,786 A | 4/2000 | Smorodinsky |
| 6,052,674 A | 4/2000 | Zervides et al. |
| 6,055,510 A | 4/2000 | Henrick et al. |
| 6,055,567 A | 4/2000 | Ganesan et al. |
| 6,058,380 A | 5/2000 | Anderson et al. |
| 6,070,150 A | 5/2000 | Remington et al. |
| 6,078,907 A | 6/2000 | Lamm |
| 6,098,053 A | 8/2000 | Slater |
| 6,128,603 A | 10/2000 | Dent et al. |
| 6,173,272 B1 | 1/2001 | Thomas et al. |
| 6,188,994 B1 | 2/2001 | Egendorf |
| 6,205,437 B1 | 3/2001 | Gifford |
| 6,285,991 B1 | 9/2001 | Powar |
| 6,289,322 B1 | 9/2001 | Kitchen et al. |
| 6,292,788 B1 | 9/2001 | Roberts et al. |
| 6,292,789 B1 | 9/2001 | Schutzer |
| 6,304,857 B1 | 10/2001 | Heindel et al. |
| 6,311,170 B1 | 10/2001 | Embrey |
| 6,317,745 B1 | 11/2001 | Thomas et al. |
| 6,334,116 B1 | 12/2001 | Ganesan et al. |
| 6,343,275 B1 | 1/2002 | Wong |
| 6,374,229 B1 | 4/2002 | Lowery et al. |
| 6,393,415 B1 | 5/2002 | Getchius et al. |
| 6,408,284 B1 | 6/2002 | Hilt et al. |
| 6,438,527 B1 | 8/2002 | Powar |
| 6,542,912 B2 | 4/2003 | Meltzer et al. |
| 6,622,128 B1 | 9/2003 | Bedell et al. |
| 6,625,616 B1 | 9/2003 | Dragon et al. |
| 7,107,244 B2 | 9/2006 | Kight et al. |
| 2001/0032181 A1 | 10/2001 | Jakstadt et al. |
| 2001/0037295 A1 | 11/2001 | Olsen |
| 2002/0002536 A1 | 1/2002 | Braco |
| 2002/0002537 A1 | 1/2002 | Bastiansen |
| 2002/0019808 A1 | 2/2002 | Sharma |
| 2002/0023055 A1 | 2/2002 | Antognini et al. |
| 2002/0029248 A1 | 3/2002 | Cook et al. |
| 2002/0065772 A1 | 5/2002 | Saliba et al. |
| 2002/0069163 A1 | 6/2002 | Gilbert |
| 2002/0069168 A1 | 6/2002 | Lee et al. |
| 2002/0087469 A1* | 7/2002 | Ganesan et al. ............... 705/40 |
| 2002/0116331 A1* | 8/2002 | Cataline et al. ............... 705/39 |
| 2002/0143583 A1 | 10/2002 | Reader et al. |
| 2003/0195844 A1 | 10/2003 | Hogan |
| 2003/0208445 A1 | 11/2003 | Compiano |
| 2004/0015413 A1 | 1/2004 | Abu-Hejleh et al. |
| 2004/0083167 A1 | 4/2004 | Kight et al. |
| 2007/0136169 A1 | 6/2007 | Dilip et al. |

FOREIGN PATENT DOCUMENTS

| | | |
|---|---|---|
| JP | 401195573 A | 8/1989 |
| WO | 91/09370 | 6/1991 |
| WO | 9741537 | 11/1997 |

OTHER PUBLICATIONS

Supplemental Information Disclosure Statement including declaration by Mark Johnson.

Merriam-Webster's Collegiate Dictionary, 10th edition; p. 293, word, "database" (1962); and p. 929, word, "processing" (1532).

White, et al.; "4-in-1 Accounting: The Basics from Real-World," PC Magazine, vol. 4, No. 20, p. 167-168, extracted on Internet from Dialog file 47, Accession #02746427 on Dec. 19, 2003.

Streeter, Bill, "The Future is Here and It's on TV," ABA Banking Journal, Nov. 1980, extracted from Internet from Corporate business source database on Jan. 28, 2003.

Blattberg, Robert C., Deighton, John, "Interactive Marketing: Exploiting the Age of Addressability," Sloan Management Review, vol. 13, No. 1, Fall 1991, p. 5-14.

Press Release, Federal Reserve System Docket No. R-0643 Regulation CC CFR Part 2 29 Availability of Funds and Collection of Checks; American Banker (pre-1997 Fulltext); New York; N.Y. Oct. 27, 1988; vol. 153, Issue. 211; extracted on Internet on Feb. 2, 2005.

Paschal, Jan; "New Edition of Rand McNally Bankers Directory Available"; Journal Record; Oklahoma City; Feb. 11, 1987, extracted on the Internet from http://proquest.umi.com on Jan. 27, 2003.

Huiyong et al., "Harcourt Brace Considers Sale of Some Assets—Chief Says Firm Discussing Potential Transactions; Thomson May Play Role", Wall Street Journal; New York; Apr. 26, 1990, extracted on the Internet from http://proquest.umi.com on Jan. 27, 2003.

Tripp, Julie, "How to Lend Uncle Sam Your Money" p. B1, The Oregonian; Portland, OR; Oct. 28, 1990), extracted from http://proquest.umi.com Jul. 16, 2002.

Excerpts "Routing Symbol and Transit Number", p. 109, Chapter 6—The Payment Function by Francis et al,, published by American Bankers Association in 1998, 1997, 1996, 1995, and 1994.

Official Routing Number Registrar—Routing Number Policy formulated jointly by American Bankers Association and the Federal Reserve System in 1976, pp. 1-22.

"ABA Routing numbers", web pages from www.aba.com.

Gullo, Karen, "Reistad Continues Quest for the 'Checkless Society' Series: 8," American Banker; New York, NY, Jul. 16, 1991, vol. 156, Issue 135.

Anonymous, "Is Video Banking Poised to Take Off (Again)?", CTS Accounting Software Survey; Jun. 1990, vol. 20, Issue 1.

Tyson, David O., "Princeton Telecom Addresses Problems of On-Line Bill Payment," American Baker; New York, NY, Aug. 9, 1989.

Unknown, Excerpt from The Bankers Magazine, Jul.-Aug. 1985 p. 54-55.

Press Release, Banks, Credit Unions Join Utilities to Expand Bill Payment Plan; [Sunrise Edition] Omaha World-Herald; Omaha, Nebraska, Aug. 30, 1989, p. 19.

Howard, Bill, "The Best of 1989," PC Magazine, Jan. 16, 1990 (excerpt).

Dunkin, Amy, "Personal Business: Software Have a PC? Now, You Can Chuck Your Checkbook," Business Week, Sep. 3, 1990.

Churbuck, David C., "Let your Fingers do the Banking," Forbes, Aug. 19, 1991.

Shipley, Chris, "CheckFree's Payment System," PC Computing, Aug. 1, 1991.

Shipley, Chris, "Electronic Bill Paying Just Got a Lot Easier," PC Computing, May 1, 1991.

Magid, Lawrence, "How to Put PC to Work Paying Bills," Los Angeles Times, Jul. 25, 1991.

Advertisement "As seen in PC Computing" with purchase order form (1989—Reprinted from PC Magazine, Nov. 14, 1989).

Malnig, Anita, "Roundup of Financial Software: Home Accountant," pp. 73-74, II Computing, vol. 1, No. 3, Feb. 1986.

Rue, Sharon Gamble, "Electronic Checkbook," MacIntosh Buyer's Guide, p. 128/1, 5/85, Abstract from Microsearch AN: 85-028312.

Hines, Tracie Forman, "The Check is in the Modern," MacUser vol. 1, No. 1, p. 6815, 10185 Abstract from Microsearch AN: 85-028676.

"Myte Myke Business System: Order-Entry Billing," Product Literature, Abstract from Microsearch file of Orbit, AN: 87-039522.

"Home Banking: A Case Study," Robert B. Willemstad, pp. 4R 55, Banker's Magazine, Nov.-Dec. 1984.

Article, "Pay Your Bills the PC Way," St. Louis Post Dispatch (SLO-Monday, Jul. 31, 1989), Magid, Lawrence J. Five Star Section, Monday's Business Section, p. 18, extracted on Internet from Dialog database.

Crossman, Craig, Herald Columnist, "Paying Bills can be an Electronic Task," Miami Herald, Mar. 12, 1990, extracted on Internet from Dialog Database, Accession #05520522.

Shipley, Chris, "I Threw Away my Checkbook," PC Computing, vol. 3, No. 11, p. 112(7), Nov. 1990, extracted on Internet from Dialog Database, Accession #01379643.

Steinberg, Jeffrey A., "CheckFree," MacUser, vol. 6, No. 8, p. 68(3), Aug. 1990, extracted on Internet from Dialog Database, Accession #01376772.

Lewis, Peter H., "Personal Computers: Managing Your Money," New York Times, Late Edition, Final ED, col. 5, p. 8, Aug. 29, 1989, extracted on Internet from Dialog Database, Accession #01871726.

Eliason, A.L., Online Business Computer Applications: 2nd Edition Science Research Associates, 1987 HF5542.2E427, pp. 18-19 and 69-71.

Press Release CheckFree Web 4.0 Makes it Easy for Mainstream Consumers to Become Satisfied Electronic Billing and Payment Users Retail Delivery Conference, Booth #2453, Nov. 19, 2003, pp. 1-5.

CheckFree Web, Marketing Material, Experience What's Next in Electronic Billing and Payment, May 2004, pp. 1-7.

Kight, Patricia, Declaration Under 37 CFR 1.132, Feb. 6, 2007.

"CheckFree Delivers E-Bill." Internet Week, Sep. 30, 1996, p. 1.

"Open Financial Exchange Bill Presentment." Open Financial Exchange Specification—1.0.2. Collaborative work of CheckFree Corp., Microsoft Corp., and Intuit, Inc. May 30, 1997, pp. 1-302.

"Open Financial Exchange Bill Presentment." Open Financial Exchange Specification. Collaborative work of CheckFree Corp., Microsoft Corp. and Intuit, Inc., Jun. 12, 1997, pp. 312-356.

"Utilities Adopt Web Bill Payment Plans." Computer World, Aug. 25, 1997.

"Utilities, Phone Companies Pilot Electronic Billing." Item Processing Report, Nov. 7, 1996, p. 1.

Bruene, Jim. "Anatomy of an MSFDC Electronic Bill." Jun. 12, 1997. <http://www.netbanker.com 1997/06/ anatomy_msfdc_electronic.html>.

Levine, Shira. "Billing with an Attitude." America's Network, p. 78. (Dialog File 6, 05424287).

Marlin, Steve. "Microsoft, First Data Alliance Seen to Boost Bill-Pay; Banks' Role Still Unclear." Bank Systems & Technology, Sep. 1997, p. 8, vol. 34, No. 9.

Tangwall, Doug. "The On-Line Billing & Payment Race." Credit Union Executive Journal, Nov./Dec. 1999, vol. 39, 6 pages.

Disclosure under 37 C.F.R. § 1.56.

Non-Final Office Action mailed Dec. 23, 2008 for U.S. Appl. No. 09/892,627.

* cited by examiner

METHODS AND SYSTEMS FOR THE DETERMINATION AND DISPLAY OF PAYMENT LEAD TIME IN AN ELECTRONIC PAYMENT SYSTEM

FIELD OF THE INVENTION

The present invention relates generally to methods and systems for determining and displaying a lead time for a payment in an electronic payment system and then forcing a payment to be issued in either electronic or paper form.

BACKGROUND OF THE INVENTION

Electronic payment systems are known in the art. An electronic payment system may include a service provider that makes payments to a payee on behalf of a payor. A payment request is submitted to the service provider by a payor or on behalf of a payor. The payment request includes information identifying the payee and an amount of the payment to be made. Once the payment request is received, the service provider processes the request to complete the payment on behalf of the payor.

The processing performed by the service provider includes determining a form of payment. Forms of payment include both paper and electronic payment. In paper payment, the service provider prepares a paper instrument (e.g., a check drawn on an account of the service provider or a draft drawn on an account of the payor) and delivers it to the payee. In electronic payment, the service provider uses one of many possible avenues to electronically credit funds to the payee. One option is to direct, via the ACH network, that funds be electronically credited to a demand deposit account belonging to the payee.

The lead time of a payment is the time that is required subsequent to payment request processing to ensure timely delivery of a payment to a payee. The lead time of an electronic payment and the lead time of a paper payment may be different. Some payment systems may display one or more lead times independent of any particular payment request. However, processing of a particular payment request may definitively determine the form or method of payment for a payment made on behalf of the payment request.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
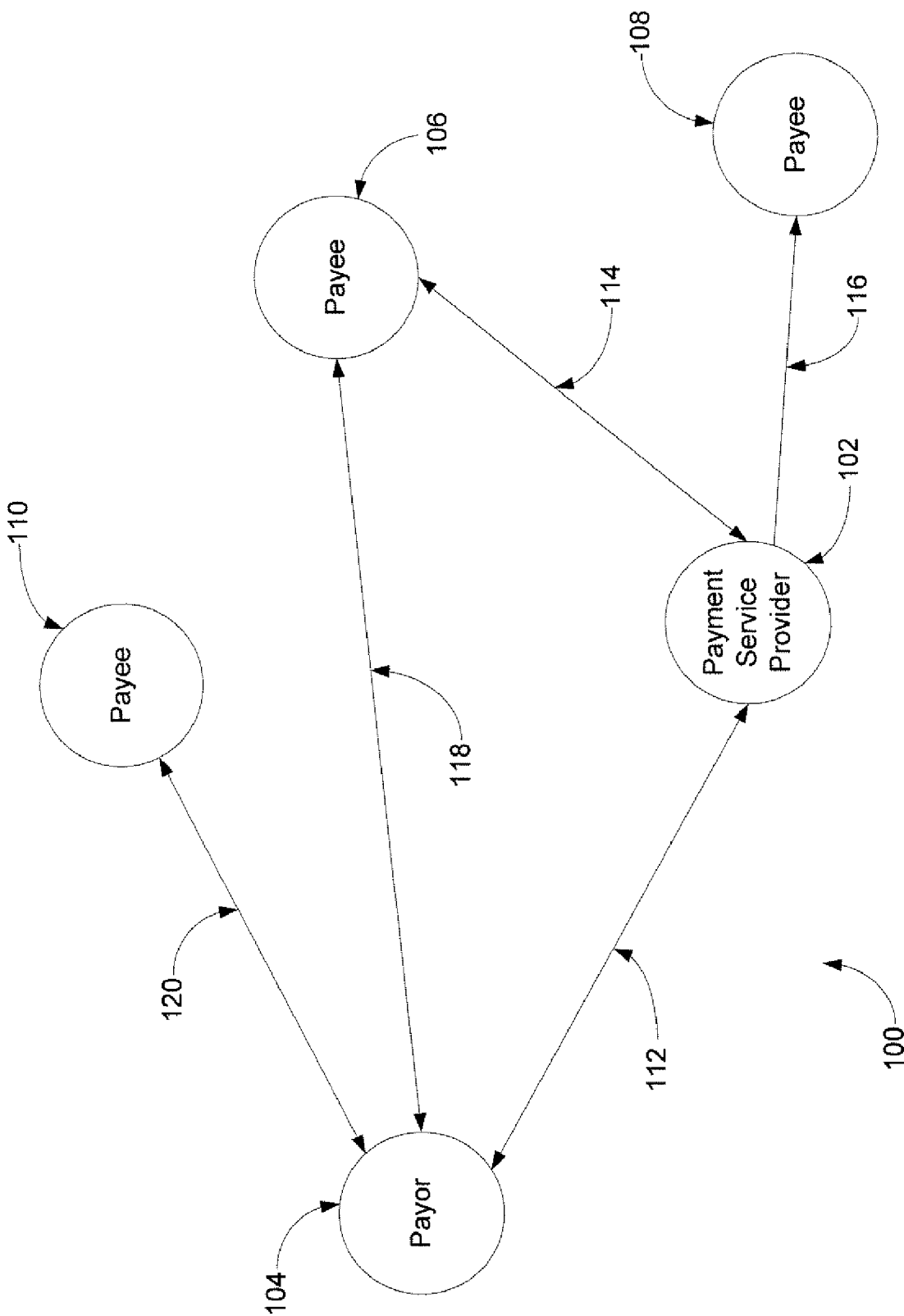
FIG. 1 is a schematic block diagram of a network utilized in conjunction with a payment service provider, according to an illustrative embodiment of the present invention.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams of systems, methods, apparatuses and computer program products according to an embodiment of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the combination of computing hardware and instructions which execute thereon constitute means for implementing the functionality of each block of the block diagrams, or combinations of blocks in the block diagrams discussed in detail in the descriptions below.

These computer program instructions may also be stored in a computer-readable memory to constitute an article of manufacture. The article of manufacture may be used in conjunction with a computing device to cause the instructions from the article of manufacture to be loaded onto and executed by the computing device, and thereby implement the function specified in the block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagrams support combinations of means for performing the specified functions, combinations of steps for performing the specified functions and program instruction means for performing the specified functions. It will also be understood that each block of the block diagrams, and combinations of blocks in the block diagrams, can be implemented by general or special purpose hardware-based computer systems that perform the specified functions or steps, or combinations of general or special purpose hardware and computer instructions.

The inventions may be implemented through one or more application programs running on one or more operating systems of one or more computers. The inventions also may be practiced with diverse computer system configurations, including hand-held devices, multiprocessor systems, microprocessor based or programmable consumer electronics, mini-computers, mainframe computers, etc.

Application programs that are components of the invention may include modules, objects, data structures, etc., that perform certain tasks or implement certain abstract data types. A particular application program (in whole or in part) may reside in a single or multiple memories. Likewise, a particular application program (in whole or in part) may execute on a single or multiple computers or computer processors. Exemplary embodiments of the present invention will hereinafter be described with reference to the figures, in which like numerals indicate like elements throughout the several drawings.

FIG. 1 provides an illustrative embodiment of a network 100 that may be utilized in conjunction with a payment service provider 102 in accordance with the present invention.

As shown in FIG. 1, the network 100 may include a payment service provider 102, a payor 104, a first payee 106, a second payee 108, and a third payee 110. For purposes of describing the present invention, only a single payor 104 and three payees 106, 108, and 110 are shown; however, it will be understood by those of skill in the art that the network 100 may include any number of payors and payees.

Various components of the network 100 may be in communication with one another via communications links 112, 114, 116, 118, and 120. It will be understood that each of the communications links 112, 114, 116, 118, and 120 could be any type of communications link such as, for example, a network-based communications link over the Internet. Additionally, the network 100 may be any network including, but not limited to, the Internet, a local area network, a wide area network, a public switched telephone network, a wireless network, or any combination thereof.

The payor 104 may be in communication with the payment service provider 102 via a first communications link 112. According to an aspect of the present invention, the payor 104 may submit payment requests to the payment service provider 102. The payment requests may be requests for the payment service provider 102 to submit a payment to the first payee 106 or the second payee 108 on behalf of the payor 104. A payment made by the payment service provider 102 may be any type of payment including, but not limited to, payment of a bill issued by a payee, a point-of-sale payment, a payment for goods or services purchased via a network interface, and a person-to-person payment. In addition to a payment submitted to a payee, the payment service provider 102 may also issue remittance advice to the payee. The term remittance may be used to encompass the combination of a payment and remittance advice associated with the payment. The remittance advice may be a description of the breakdown of a particular payment or credit that allows proper payment posting to specific accounts or sub-accounts in a payee's accounts receivable system.

The payment service provider 102 may submit one or both of electronic and paper payments to the first payee 106 and/or the second payee 108. For an electronic payment, the payment service provider 102 may direct that funds be electronically credited to a deposit account belonging to the first payee 106 or the second payee 108 and that funds be electronically debited from a deposit account belonging to the payor 104. For a paper payment, the payment service provider 102 may prepare a paper instrument (e.g., check or draft) and deliver it to the first payee 106 or the second payee 108.

The payment service provider 102 may also be in communication with the first payee 106 and the second 108. As shown in FIG. 1, the payment service provider 102 may be in communication with the first payee 106 via a second communications link 114 and the payment service provider 102 may be in communication with the second payee 108 via a third communications link 116. It will be understood by those of skill in the art that the second communications link 114 may not be the same type of communications link as the third communications link 116. For example, the payment service provider 102 may be in communication with the first payee 106 via a network connection, and the payment service provider 102 may not be in communication with the second payee 108 via a network connection. Instead, the payment service provider 102 may only be in communication with the second payee 108 via more traditional means such as, for example, standard mail or postal service. Such a situation might exist if the second payee 108 is only capable of receiving a paper payment from the payor 104 or payment service provider 102.

It will also be understood that the payment service provider 102 may also be capable of presenting bills to a payor 104. For example, the payment service provider 102 may receive billing information from the first payee 106. The billing information may include detailed and/or summary billing information of a bill issued by the first payee 106 for the payor 104. The payment service provider 102 may receive the billing information from the first payee 106 via the second communications link 114 and then electronically present detailed and/or summary billing information to the payor 104 via the first communications link 112.

In accordance with the present invention, the payor 104 may be in direct communication with payees via communications links. As shown in FIG. 1, the payor 104 may be in communication with the first payee 106 via a fourth communications link 118 and the payor 104 may be in communication with a third payee 110 via a fifth communications link 120. The payor 104 may submit payments directly to one or both of the first payee 106 and the third 110 instead of having payments submitted by the payment service provider 102. The fourth communications link 118 and the fifth communications link 120 may be network-based communications links and/or more traditional communications links as described above. It will further be understood that one or both of the first payee 106 and the third payee 110 may also be capable of presenting billing information directly to the payor 104 rather than transmitting billing information to the payment service provider 102 for presentment to the payor 104.

The payment service provider 102, the payor 104, and the payees 106, 108, and 110 may each incorporate a network station and the combination of network stations may support the network 100. Each network station may include a control unit 200 that coordinates its communications with the network 100, as described in greater detail below with reference to FIG. 2. It will be understood, however, that each entity does not necessarily have to incorporate a network station and/or include a control unit. For example, a payee that is not capable of receiving an electronic payment may not incorporate a network station and/or include a control unit that coordinates its communications with the network 100. In other words, a payee that is only capable of receiving a paper payment need not necessarily include a network station or a control unit.

Figure 2:
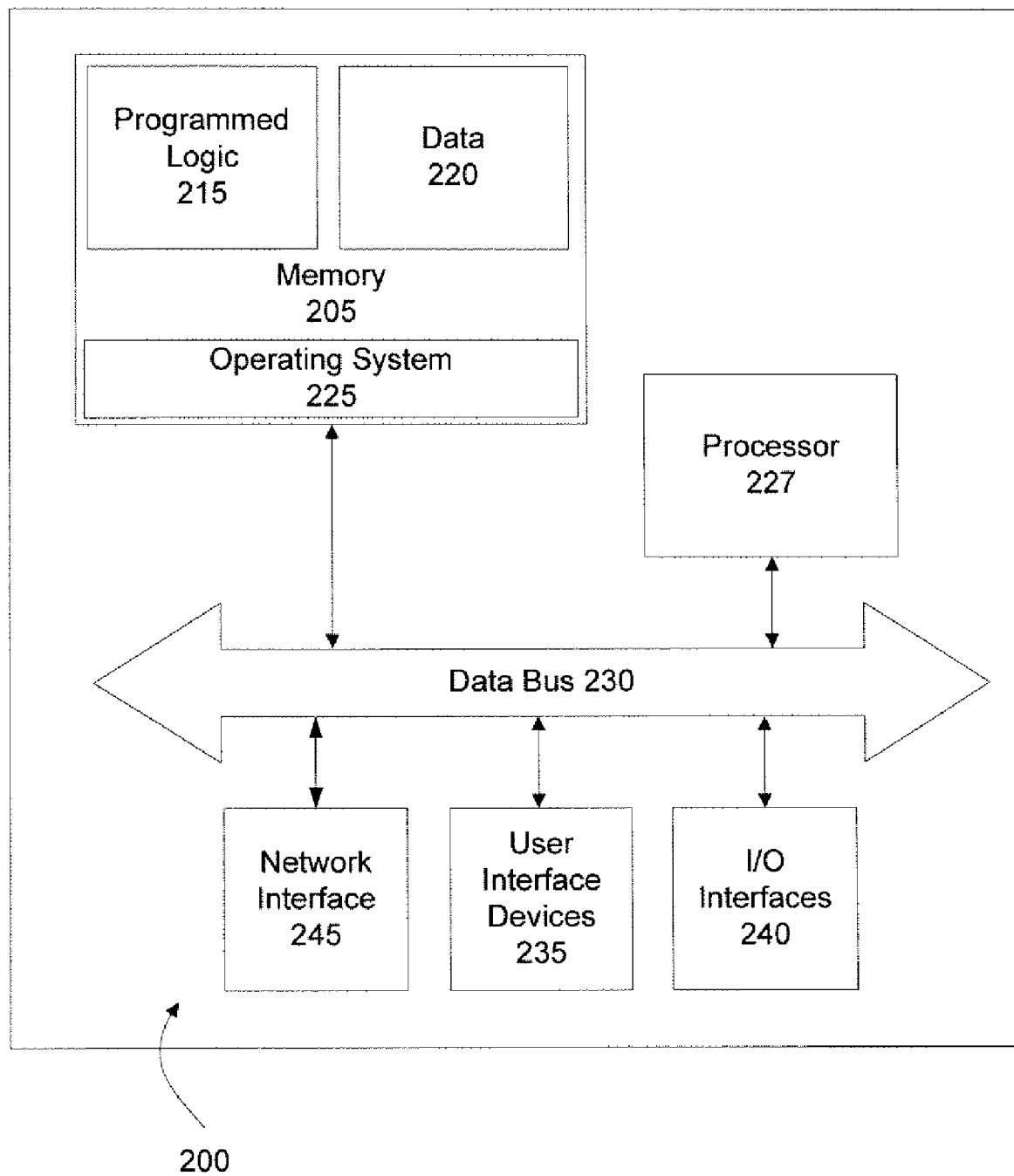
FIG. 2 is a control unit utilized by a payment service provider, according to an illustrative embodiment of the present invention.

FIG. 2 is a block diagram of a control unit 200 utilized by a payment service provider 102, according to an illustrative embodiment of the present invention. It will be understood that the payor 104 and payees 106, 108, and 110 may utilize similar control units as that utilized by the payment service provider 102.

The control unit 200 may include a memory 205 that stores programmed logic 215 (e.g., software) in accordance with the present invention. The memory 205 may also include data 220 that may be utilized in the operation of the present invention and an operating system 225. A processor 227 may utilize the operating system 225 to execute the programmed logic 215, and in doing so, may also utilize the data 220. A data bus 230 may provide communication between the memory 205 and the processor 227. Users may interface with the control unit 200 via a user interface device(s) 235 such as a keyboard, mouse, control panel, display, microphone, speaker, or any other devices capable of communicating information to or from the control unit 200. The control unit 200 may be in communication with other external devices via I/O Interfaces 240. Additionally, the control unit 200 may be in communication with the network 100 and other devices or network stations via a network interface 245. Further the control unit 200 and the programmed logic 215 implemented thereby may comprise software, hardware, firmware or any combination thereof. Although the control unit 200 is described herein as having a single processor 227, it will be appreciated that the control unit 200 may include any number of processors and/or network-based appliances. Additionally, it will be understood that different functions performed by the control unit 200 may be performed by different processors or different network-based appliances of the control unit 200. The control unit 200 may be a personal computer, mainframe computer, minicomputer, PDA, cell phone, television set top box, web box, or any other computer device or any combination thereof. It will also be appreciated that more than one memory device may be included in the control unit 200 or in communication with the control unit 200. The one or more memory devices may also be associated with one or more databases. The one or more databases may include data or information relating to the various payors, payees, and/or other entities associated with the network. The one or more databases may further include data or information relating to relationships between the various payors, payees, and/or other entities.

According to an aspect of the present invention, the payment service provider 102 may submit payments to the first payee 106 and the second payee 108 on behalf of the payor 104. Prior to submitting a payment on behalf of the payor 104, the payment service provider 102 may receive a payment request from the payor 104 or on behalf of the payor 104. If a payment request is received on behalf of the payor 104, the payment request may be received from any entity acting on behalf of the payor 104 such as, for example, a sponsor of the payor 104 or a financial institution at which the payor 104 has an account. The payment request may be received by the payment service provider 102 at any point in time prior to the submission of a payment to the first payee 106 or the second payee 108. Additionally, a single payment request may request that multiple payments be made to one or more of the first payee 106 and the second payee 108. For example, a payment request may direct or request the payment service provider 102 to submit a payment to the first payee 106 at the end of each month. As another example, a single payment request may direct or request the payment service provider 102 to submit a payment to each payee identified by the payor 104 or to each payee for which the payment service provider 102 has received billing information indicating that a payment should be received from the payor 104. It will also be appreciated that the payment service provider 102 may submit a single payment in response to more than one received payment request. For example, the payment service provider 102 may submit a single payment, also referred to as a consolidated payment in this example, to a payee on behalf of multiple payors.

The payor 104 may transmit payment requests to the payment service provider 102 via the first communications link 112. A network connection may be established between the payor 104 and the payment service provider 102. For example, a network connection may be established between a control unit of the payor 104 and a control unit of the payment service provider 102. It will be appreciated that, if an entity submits a payment request on behalf of the payor 104, the entity may transmit the payment request to the payment service provider 102.

According to an aspect of the present invention, one or more graphical user interface screens may be displayed to the payor 104 and utilized in the submission of payment requests to the payment service provider 102. A portion or all of the graphical user interface screens may be communicated over the network 100 to the payor 104 by the payment service provider 102 and then displayed to the payor 104. For example, graphical user interface screens may be communicated to the payor 104 over the Internet and then displayed to the payor 104 via an Internet web browser running on a personal computer associated with the payor 104. The payor 104 may input information into the graphical user interface screens that is then communicated back to the payment service provider 102. It will be appreciated that the graphical user interface screens may also be communicated to the payor 104 by one or more other entities such as, for example, by a sponsor. In such a situation, the payor 104 may be in communication with the sponsor and the payment service provider 102 may be in communication with the sponsor. As an example, the sponsor may be a financial institution in communication with the payor 104. The payor 104 may communicate with the financial institution via graphical user interface screens and the financial institution may be in communication with the payment service provider 102. It will also be understood that the payor 104 may be in communication with both a payment service provider 102 and one or more other entities. Additionally, in a situation where the payor 104 is in direct communication with a payee, the graphical user interface screens may be communicated or transmitted to the payor 104 by the payee. It will also be understood that a graphical user interface screen may be generated by one entity such as, for example, a sponsor or a payee, and communicated either directly to the payor 104 or indirectly to the payor 104 through one or more other entities such as, for example, a payment service provider 102.

It will be understood that a variety of graphical user interface screens may be displayed to the payor 104. These graphical user interface screens may include screens that relate to submitting payment requests and, in some embodiments, may include screens that relate to the presentment of bills to the payor 104. According to an aspect of the present invention, a payment and presentment screen 300 may be displayed to the payor 104. The functionality of the payment and presentment screen 300 is described in greater detail below with reference to FIG. 3. Examples of other graphical user interface screens that may be displayed to the payor 104 include, but are not limited to, a login and user verification screen, a payor enrollment screen, a payee initialization screen, a summary bill presentment screen, and a detailed bill presentment screen.

Figure 3:
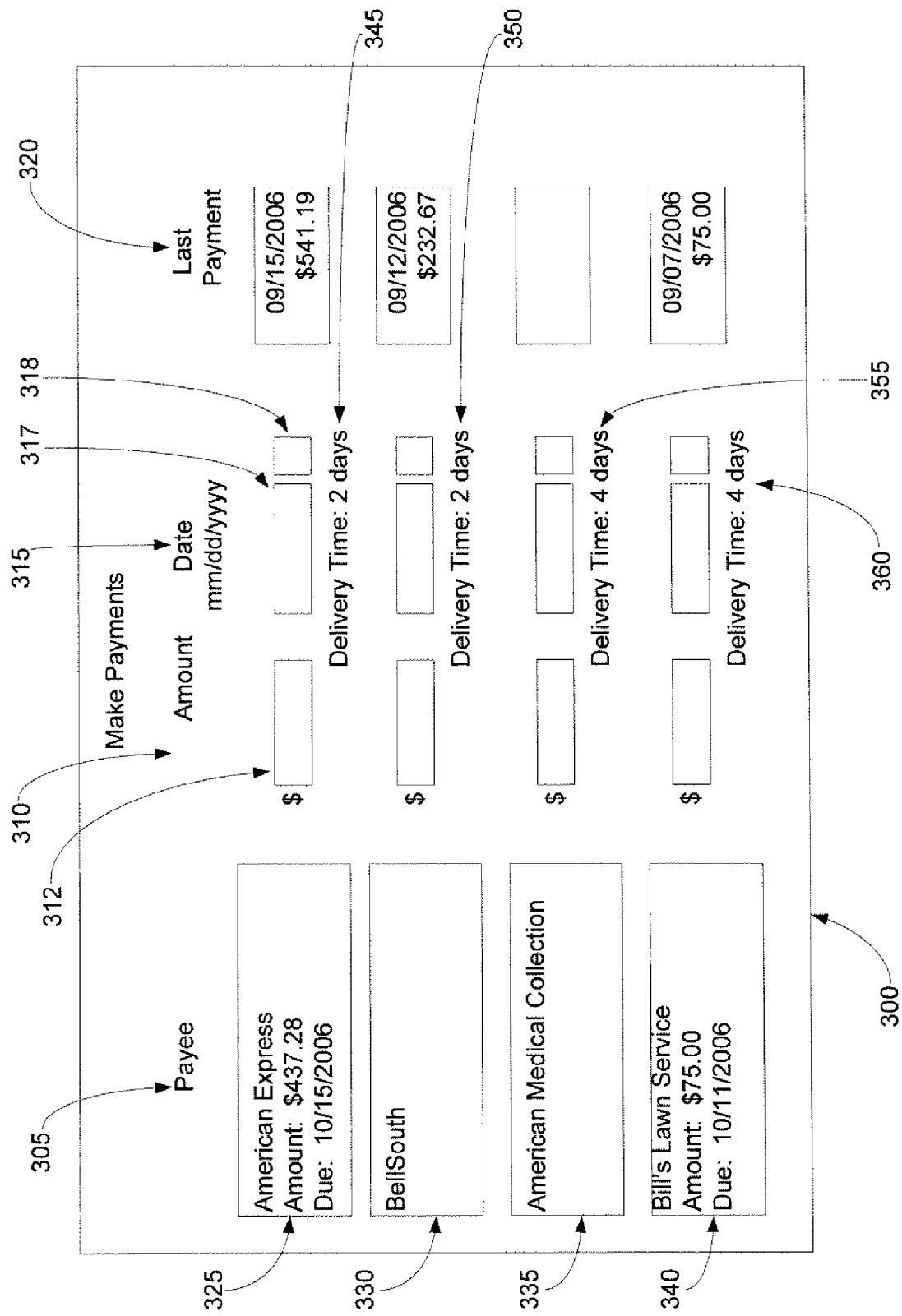
FIG. 3 is an exemplary payment presentment screen provided to a payor by a payment service provider, according to an illustrative embodiment of the present invention.

FIG. 3 is an exemplary payment and presentment screen 300 provided to a payor 104 by a payment service provider, according to an illustrative embodiment of the present invention. The payment and presentment screen 300 may allow a payor 104 to identify payees to which the payor 104 desires the payment service provider 102 to submit a payment.

As shown in FIG. 3, the payment and presentment screen 300 may include a payee column 305, an amount column 310, a date column 315, and a last payment column 320. The payee column 305 identifies one or more payees which the payor 104 may pay via a payment request. The payees listed in the payee column 305 may be payees that have been predefined, pre-selected, or pre-established by payor 104. Alternatively, or in addition to the predefined or pre-selected payees, the payees listed in the payee column 305 may be entered into the payee column 305 by the payor 104 via any suitable user input such as, for example, a keyboard and/or a mouse. The amount column 310 allows the payor 104 to enter or select a desired monetary amount for a payment request. It will be appreciated that the amount column 310 may additionally or alternatively be pre-populated and presented to the payor 104 based on preferences of the payor 104 and/or billing information received from a payee. A desired monetary amount may be entered into or displayed in an amount box 312 associated with a payee. The date column 315 allows a payor 104 to enter a desired date for payment processing to be initiated or for payment processing of be received by the payee. A desired date may be entered into a date box 317 associated with a payee. Alternatively, a date may be selected by the payor 104 from a calendar by clicking on a calendar link 318 or calendar button associated with a payee. It will be appreciated that the date may be pre-populated and presented to the payor 104 based on preferences of the payor 104 and/or billing information received from the payee. The last payment column 320 allows the payment service provider 102 to display the date and amount of the last payment that was submitted to a payee on behalf of the payor 104. It will be understood by those of skill in the art that a portion of or all of the information that is pre-populated and displayed to a payor 104 in the payment and presentment screen 300 may be overridden by the payor 104.

The payment and presentment screen 300 of FIG. 3 has four identified payees 325, 330, 335, and 340. An identified payee is a payee that has been established by the payor 104 and may be any payee that is capable of receiving a payment on behalf of the payor 104. The four identified payees 325, 330, 335, and 340 are exemplary payees for which the payment service provider 102 might receive a payment request. The first identified payee 325 may be a managed payee that is capable of receiving an electronic payment. A managed payee is a payee about whom the service provider 102 has information that enables a remittance payment to that payee to be handled in some improved/optimal fashion. The information may include one or more of: account schemes for improved reliability of accounts receivable posting at the managed payee, account ranges for remittance center identification, other information for remittance center identification, payee preferred payment form (paper or electronic), payee preferred remittance advice form (paper or electronic, and format/syntax), and electronic communication parameters for delivery of electronic credits and/or electronic remittance advice. The managed payee information may be stored in the memory 205 of the control unit 200 associated with the payment service provider 102. The term electronic managed payee may be used to describe a managed payee that can receive remittance electronically. It will also be appreciated that in many instances the term managed payee may be used to describe a managed payee that is capable of receiving remittance electronically.

For the first identified payee 325 shown in FIG. 3, the payment service provider 102 may have already received billing information associated with the payment to be made to the first identified payee 325. For example, the first identified payee 325 may have communicated or transmitted billing information to the payment service provider 102. The billing information may include data such as, for example, a billing amount and a due date for a bill. This billing information may be presented to the payor 104 by the payment service provider 102 prior to a payment request being received from the payor 104. For example, summary billing information including the next payment amount and due date for the first identified payee 325 may be presented to the payor 104, as shown in FIG. 3 below the name of the first identified payee 325.

The second identified payee 330 may be a managed payee that is capable of receiving an electronic payment from the payment service provider 102. In contrast to the first identified payee 330, the payment service provider 102 may not have received billing information from the second identified payee 330. The payment service provider 102, however, may have information stored in the memory 205 of its control unit 200 that identifies previous payments that have been made to the second identified payee 330, as depicted in the last payment column 320 of the payment presentment screen 300.

Once the payor 104 identifies the second identified payee 330 to the payment service provider 102, the information relating to previous payments may be retrieved from the memory 205 and displayed to the payor 104.

The third identified payee 335 may be a payee to which the payment service provider 102 has not previously submitted a payment on behalf of the payor 104. The third identified payee 335 may be either a managed payee or an unmanaged payee. An unmanaged payee is a payee about whom the payment service provider 102 does not maintain information which aids in the handling of remittance. If no previous payment has been submitted to the third identified payee 335, then the payment service provider 102 may be unable to display any information in the last payment column 320 for the third identified payee 335.

The fourth identified payee 340 may be an unmanaged payee that is only capable of receiving a paper payment from the payment service provider 102. Accordingly, the payment service provider 102 is unable to submit an electronic payment to the fourth identified payee 340. A previous payment may or may not have been submitted to an unmanaged payee by the payment service provider 102. As shown in FIG. 3, the fourth identified payee 340 has received a previous payment from the payment service provider 102 on behalf of the payor 104.

In response to a received payment request, the payment service provider 102 may submit a payment to an identified payee 325, 330, 335, or 340 on behalf of the payor 104. Either an electronic payment or a paper payment may be submitted by the payment service provider 102. For a paper payment, the payment service provider 102 prepares either a check or draft and delivers it to an identified payee 325, 330, 335, or 340. A check may be drawn on an account associated with the payment service provider 102, or a draft may be drawn on an account associated with the payor 104. If payment is made by check, then the payment service provider 102 may obtain funds from the payor 104 prior to issuing the payment, approximately simultaneously with issuing the payment, or at a later point in time. In electronic payment, the payment service provider 102 may direct that funds be electronically credited to a deposit account belonging to an identified payee 325, 330, 335, or 340.

According to an aspect of the present invention, a delivery time may be associated with each payment submitted by the payment service provider 102 on behalf of a payor 104. The delivery time is the approximate or estimated time that will elapse between the start of payment processing by the payment service provider 102 and the identified payee 325, 330, 335, or 340 receiving a payment made on behalf of the payor 104. The delivery time may also be referred to as a lead time. Each identified payee 325, 330, 335, or 340 may have at least one electronic lead time and at least one paper lead time associated with it. An electronic lead time is the approximate time that will elapse between the start of payment processing by the payment service provider 102 and an identified payee 325, 330, 335, or 340 receiving an electronic payment made on behalf of the payor 104. The electronic lead time may be any length of time required to deliver the electronic payment such as, for example, a two day period of time. Similarly, a paper lead time is the approximate time that will elapse between the start of payment processing by the payment service provider 102 and an identified payee 325, 330, 335, or 340 receiving a paper payment (e.g., a check or draft) made on behalf of the payor 104. The paper lead time may be any length of time required to deliver the paper payment such as, for example, a four day or five day period of time.

It will be understood by those of skill in the art that multiple electronic lead times may be associated with any given identified payee 325, 330, 335, or 340. For example, a different electronic lead time may be associated with payments made via the Federal Reserve Automated Clearinghouse Network, payments made via other financial institution networks, payments made via a remittance network, or payments made via any other mode of moving funds which does not require paper instructions. Examples of systems that describe various modes of electronic payment and selection between the multiple modes of payment are described in U.S. patent application Ser. No. 10/234,533, entitled "Payment Processing with Selective Crediting," which was filed on Sep. 5, 2002, and in U.S. patent application Ser. No. 10/631,974, entitled "Multiple Distributed Operating Accounts," which was filed on Aug. 1, 2003. It will also be understood that multiple paper lead times may be associated with any given identified payee 325, 330, 335, or 340. For example, a different paper lead time may be associated with payments made via a check and payments made via a draft. Additionally, it will be understood that the one or more paper lead times may vary between payees. For example, it may take less time for a paper payment to reach a payee located in the same geographic area as the payment service provider 102 than it will take for a paper payment to reach a payee located across the country from or in a different country than the payment service provider 102.

According to an aspect of the present invention, an expected payment lead time or payment delivery time may be displayed to a payor 104 prior to the submission of a payment request by the payor 104 to the payment service provider 102. As shown in FIG. 3, an expected payment lead time or payment delivery time may be displayed for each of the identified payees 325, 330, 335, and 340. More specifically, a first expected payment delivery time 345 may be displayed for the first identified payee 325, a second expected payment delivery time 350 may be displayed for the second identified payee 330, a third expected payment delivery time 355 may be displayed for the third identified payee 335, and a fourth expected payment delivery time 360 may be displayed for the fourth identified payee 340. With reference to FIG. 3, expected electronic payment delivery times of approximately two days are displayed for the first identified payee 325 and the second identified payee 330. Expected paper payment delivery times of approximately four days are displayed for the third identified payee 335 and the fourth identified payee 340.

As described in greater detail below with reference to FIGS. 4-5, the control unit 200 of the payment service provider 102 may calculate or determine an expected payment delivery time or expected payment lead time for each identified payee 325, 330, 335, and 340 prior to receiving a payment request from the payor 104. This expected payment delivery time may then be displayed to the payor 104. The expected payment delivery time should reflect the form of payment that the payment service provider 102 expects to make to an identified payee 325, 330, 335, or 340 if a payment request is received from the payor 104. The expected payment delivery time should match the form of payment that is determined following receipt of a payment request a high percentage of the time. In the event that the expected payment delivery time does not match the form of payment determined following a payment request, it is desired that a negative experience not result for the payor 104. A negative experience for the payor 104 may be, for example, a late payment being submitted to an identified payee 325, 330, 335, or 340. These negative experiences are discussed in greater detail below with reference to FIGS. 5-6.

Following the receipt of a payment request from the payor 104, the payment service provider 102 may recalculate the expected payment delivery time or expected payment lead time, as explained in greater detail below with reference to FIG. 6. Additionally, after the receipt of a payment request from the payor 104, the payment service provider 102 may determine the form of payment that will be used to submit a payment to an identified payee 325, 330, 335, or 340. As explained below, the payment service provider 102 may consider one or more of a wide variety of payment attributes to determine the form of payment that will be used. These payment attributes may relate to the payor 104, the identified payee 325, 330, 335, or 340 and/or to the payment service provider 102. It will further be appreciated that, in the event that another entity such as, for example, a sponsor is utilized in accordance with the present invention, one or more of a wide variety of payment attributes may relate to the another entity.

Figure 4:
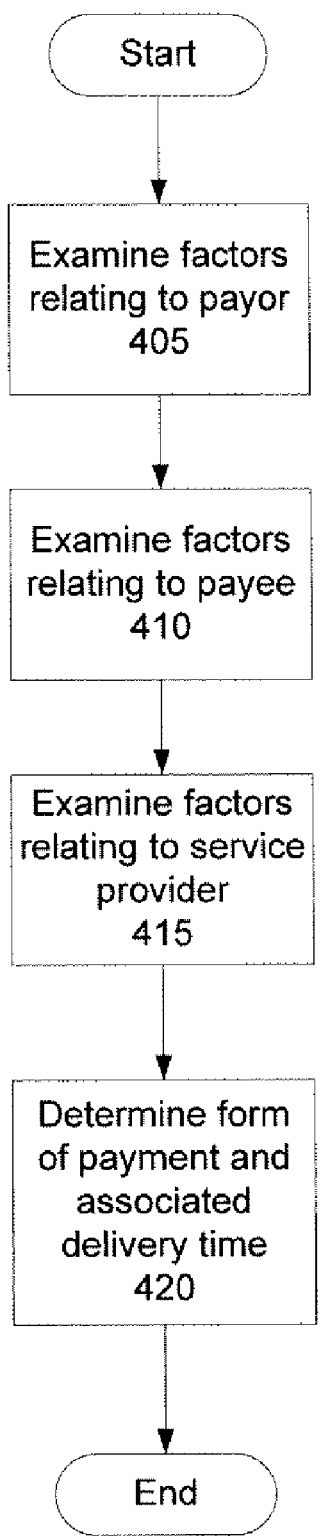
FIGS. 4-6 are exemplary flowcharts of the control logic utilized by the control unit of FIG. 2, according to an illustrative embodiment of the present invention.
Figure 5:
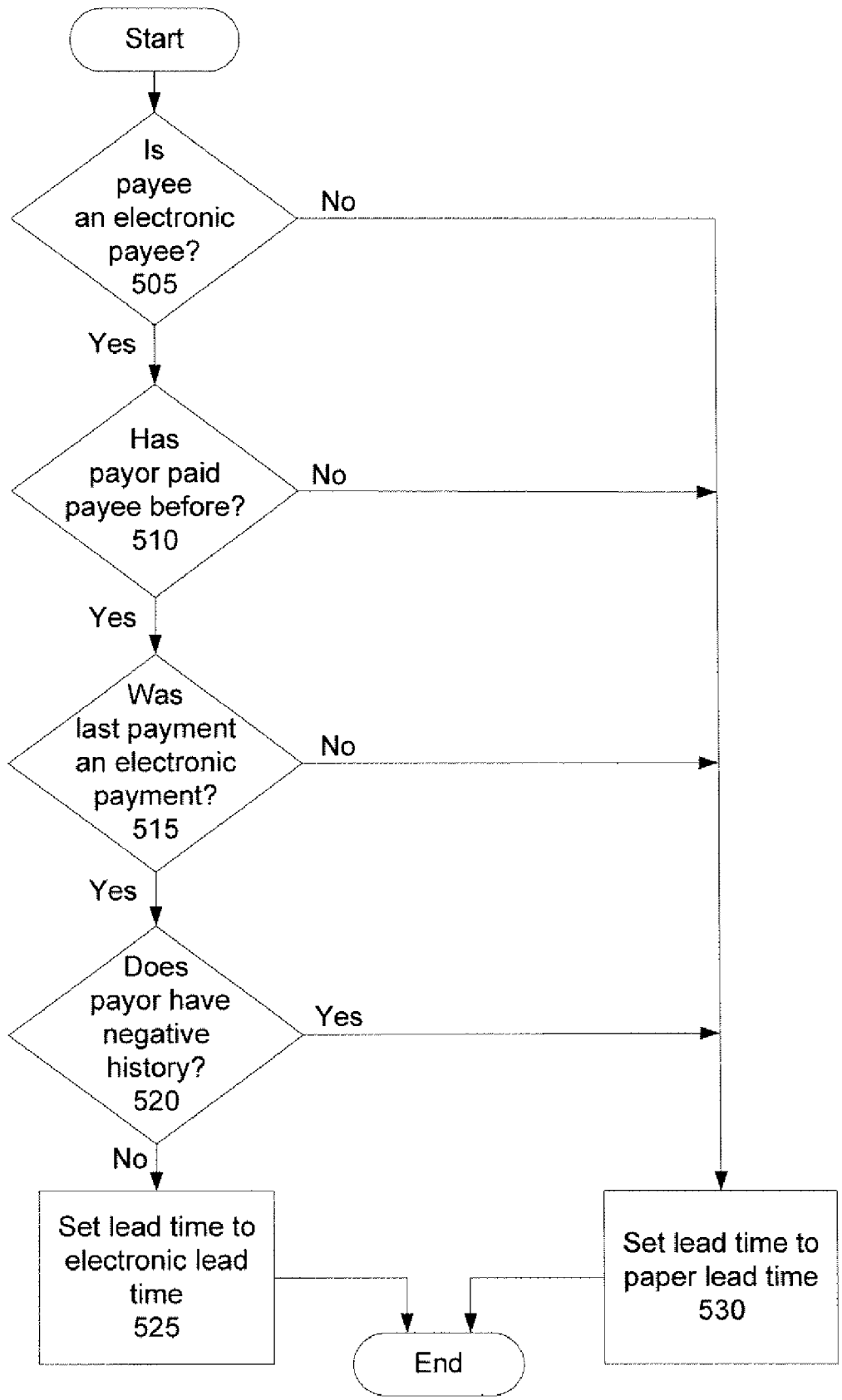
Figure 6:
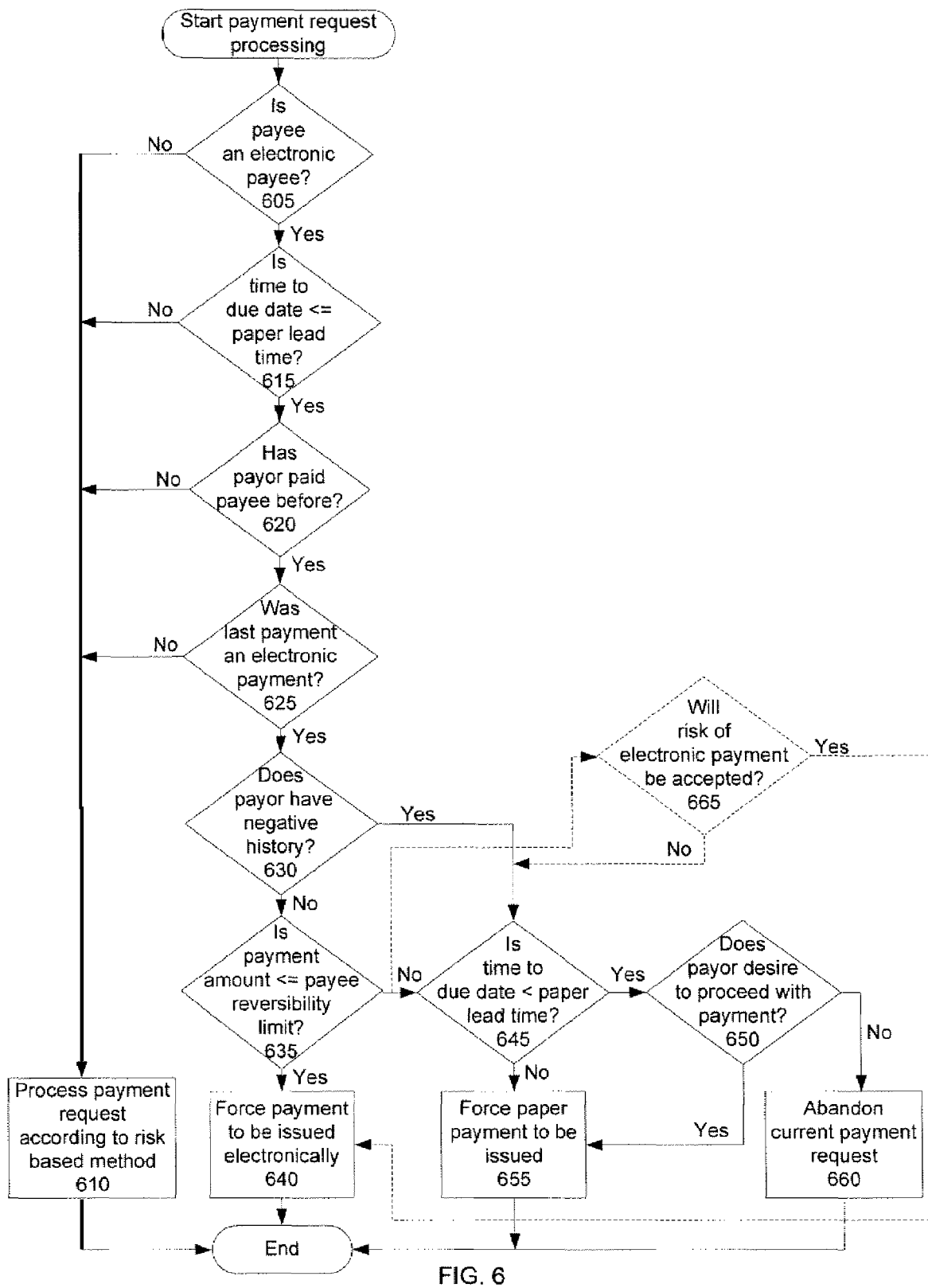

FIGS. 4-6 are exemplary flowcharts of the control logic utilized by the control unit 200 of FIG. 2, according to an illustrative embodiment of the present invention. The control logic may be within the programmed logic 215 stored in the memory 205 of the control unit 200 of the payment service provider 102. Alternatively, the control logic may be distributed among any of the components of the network 100.

FIG. 4 is a high level flowchart of the control logic utilized by the control unit 200 to determine an expected method of payment and associated expected payment delivery time for a payment. The steps shown in FIG. 4 may be executed to determine an expected method of payment and expected payment delivery time before and/or after a payment request is received by the payment service provider 102. The control unit 200 may evaluate a wide variety of attributes or factors in determining a method of payment. These payment attributes may relate to the payor 104, to an identified payee 325, 330, 335, or 340, and/or to the payment service provider 102. If utilized in accordance with the present invention, these payment attributes may also relate to another entity such as, for example, a sponsor. Additionally, it will be understood that these payment attributes may be stored in the memory 205 of the control unit 200. Alternatively, these payment attributes may be stored remotely to the control unit 200 and communicated to the control unit 200.

With reference to FIG. 4, at step 405, the control unit 200 may examine payment attributes or factors relating to the payor 104, and then the control unit 200 may go to step 410. At step 410, the control unit 200 may examine payment attributes relating to an identified payee 325, 330, 335, or 340, and then the control unit 200 may go to step 415. At step 415, the control unit 200 may examine payment attributes relating to the payment service provider 102, and then the control unit 200 may go to step 420. At step 420, the control unit 200 may determine an expected method or form of payment based on the examined factors. Once an expected method of payment has been determined, then an expected payment delivery time associated with the method of payment may be determined. If the steps of FIG. 4 are performed prior to receiving a payment request, it will be appreciated that the determined expected paper lead time or expected electronic lead time may be a payee-specific expected lead time. It will be appreciated that the steps described and shown in FIG. 4 may be carried out or performed in any suitable order. It will also be appreciated that not all of the steps described in FIG. 4 need to be performed in accordance with the present invention and/or that additional steps may be performed in accordance with the present invention. For example, an additional category of factors may be examined. These factors may relate to another entity such as, for example a sponsor.

FIG. 5 is a flowchart of the control logic utilized by the control unit 200 to determine, prior to the receipt of a payment request an expected form of payment and an expected payment delivery time for a payment to be made to an identified payee 325, 330, 335, or 340. For purposes of explaining the control logic depicted in FIG. 4, reference will be made to the first identified payee 325, which will simply be referred to as the identified payee 325; however, it will be understood that the same control logic could be utilized for any identified payee.

After a payee 325 is identified to the payment service provider 102, either by the payor 104 or by the payment service provider 102 receiving billing information from the payee 325, the control logic of FIG. 4 may be initiated and the control unit 200 then enters step 505. At step 505, the payment service provider 102 may determine whether or not the identified payee 325 is a payee that is capable of receiving electronic payment. This determination may be based on whether or not the identified payee 325 is recognized as an electronic managed payee of the payment service provider 102. If, at step 505, it is determined that the identified payee 325 is not capable of receiving an electronic payment, then the control unit 200 may go to step 530 and set the expected payment form to paper payment. Additionally, the control unit 200 may set the delivery time for the payee 325 to a paper lead time. It will be understood that different paper lead times may be used for different forms of paper payment and that the payment service provider 102 may determine which form of paper payment will likely take place in the event that a payment request is made by the payor 104. Additionally, it will be understood that different paper lead times may be associated with or used for different payees. The determination of the form of paper payment may be based on characteristics associated with the payment service provider 102, the payor 104, and/or the identified payee 325. For example, if the payor 104 has not yet used the payment service provider 102 to submit payments, then a paper payment may be sent by a draft drawn on an account associated with the payor 104 rather than by a check drawn on an account associated with the payment service provider 102.

If, however, at step 505, it is determined that the identified payee 325 is capable of receiving an electronic payment, then the control unit 200 may go to step 510. At step 510, the control unit 200 may determine whether or not the payor 104 has submitted a payment request relating to the identified payee 325 in the past. If the payor 104 has not previously submitted a payment request for a payment to be made to the identified payee 325, then the control unit 200 may go to step 530 and set the expected payment form to paper payment. Additionally, the control unit 200 may set the expected payment delivery time for the identified payee 325 to a paper lead time. The expected payment form may be set to paper payment in order to allow the payment service provider 102 to manage risks associated with new payment relationships. Accordingly, if a payment has not previously been submitted to an identified payee 325 on behalf of the payor 104, it may be desirable for the payment service provider 102 to perform some form of risk analysis prior to submitting the payment. If, however, at step 510, the control unit 200 determines that the payor 104 has previously submitted a payment request relating to the identified payee 325, then the control unit 200 may go to step 515.

At step 515, the control unit 200 may determine whether the last payment made to the identified payee 325 on behalf of the payor 104 was an electronic payment. If the last payment made was not an electronic payment, then the control unit 200 may go to step 530 and set the expected payment form to paper payment. Additionally, the control unit 200 may set the expected payment delivery time for the identified payee 325 to a paper lead time. The expected payment form may be set to paper payment in order to allow the payment service provider 102 to manage risk associated with the payment. If the last payment submitted to the identified payee 325 on behalf of the payor 104 was not an electronic payment, there may be a risk associated with subsequent payments submitted to the identified payee 325 on behalf of the payor 104. If, however, at step 515, the control unit 200 determines that the last payment made to the identified payee 325 was an electronic payment, then the control unit 200 may go to step 520.

At step 520, the control unit 200 may determine whether any negative history is associated with the payor 104. If the control unit 200 determines that there is negative history associated with the payor 104, then the control unit 200 may go to step 530 and set the expected payment form to paper payment. Additionally, the control unit 200 may set the expected payment delivery time for the identified payee 325 to a paper lead time. Negative history associated with the payor 104 may be stored in the memory 200 of the control unit 200. Additionally, the negative history examined by the control unit 200 may be negative history that has occurred in a previous period of time. The previous period of time may have a fixed duration or, alternatively, may include all or a portion of the payor's prior history with the payment service provider 102. For example, the negative history of the payor 104 may be examined for the past two months, six months, or one year.

Negative history associated with the payor 104 may be any previous event that may lead to a desire by the payment service provider 102 to perform risk management on any payment request submitted by the payor 104. An example of negative history may be an inability of the payment service provider 102 to procure funds from a payor 104 during a previous payment request after one or more attempts to procure those funds. If the payment had already been submitted by the payment service provider 102 by utilizing an account or funds associated with the payment service provider 102, then the inability to procure funds from the payor 104 may result in a loss for the payment service provider 102 or in a collection action being brought against the payor 104.

If, however, at step 520, the control unit 200 determines that there is no negative history associated with the payor 104 during a predetermined preceding time period, then the control unit 200 may go to step 525. At step 525, the control unit 200 may set the expected payment form to electronic payment. Additionally, the control unit 200 may set the expected payment delivery time for a payment made to the identified payee 325 to an electronic payment delivery time. It will be understood that different electronic payment delivery times may be used for different forms of electronic payment and that the payment service provider 102 may determine which form of electronic payment will likely take place in the event that a payment request is made by the payor 104. The determination of the form of electronic payment may be based on characteristics associated with the payment service provider 102, the payor 104, and/or the identified payee 325. If another entity such as, for example, a sponsor is utilized in accordance with the present invention, the determination of the form of electronic payment may alternatively or additionally be based on characteristics associated with the another entity.

It will further be understood that the payment service provider 102 may store data relating to previous payments submitted to an identified payee 325 on behalf of a payor 104.

This data may be stored in the memory 205 of the control unit 200. The stored data may relate to the length of time that it has taken for prior payments, either electronic or paper, to reach the identified payee 325. The stored data may include, for example, dates or times at which payments were received, posted or released by the identified payee 104. Based on the stored information, the payment service provider 102 may determine a more accurate expected payment delivery time than the general expected payment delivery time that is typically displayed for a payment form. For example, the general expected payment delivery time of an electronic payment may be two days. Based on stored data, the payment service provider 102 may be able to determine that electronic payments submitted to an identified payee 325 reach the identified payee 325 in one day. Accordingly, the payment service provider 102 may display a one day expected payment delivery time to a payor 104. An exemplary discussion of varying lead times for a payee based on information associated with previous payments or previous bills is set forth in U.S. patent application Ser. No. 10/608,562, entitled "Technique for Calculating Payee Specific Time to Payment Completion," which was filed on Jun. 30, 2003.

Once the control unit 200 has determined an expected payment form and its corresponding expected payment delivery time, the control unit 200 may display the expected payment delivery time to the payor 104 as shown in FIG. 3. If the expected payment form has been set to paper payment then the payment service provider 102 may be required to perform risk processing on any payment request received from the payor 104, as explained in greater detail below with reference to FIG. 6. It will be understood that the payment service provider 102 may perform risk processing on any payment request received from the payor 104, whether the expected payment form has been set to paper payment or electronic payment. For purposes of the present disclosure, however, the payment service provider 102 may be required to perform risk processing on any payment request received following the establishment of a paper payment as an expected payment form. In other embodiments of the present invention, the payment service provider 102 may be required to perform risk processing on any subset of payment request or for all payment requests following the receipt of the payment request. Once the payor 104 transmits or communicates a payment request to the payment service provider 102, the payment service provider 102 may recalculate the expected payment form and its corresponding expected payment delivery time.

FIG. 6 is a flowchart of the control logic utilized by the control unit 200 to determine, after the receipt of a payment request, an expected form of payment and an expected payment delivery time for a payment to be made to an identified payee 325, 330, 335, or 340. As explained in greater detail below, the control logic described with reference to FIG. 6 may attempt to identify whether a set of conditions are met which allow a streamlined determination of a payment method or, alternatively, whether a risk based processing should be utilized in order to determine the payment method. The logic displayed in FIG. 6 may be performed by the control unit 200 in a relatively short period of time such as, for example, while the payor 104 is in a communication session with the payment service provider 102. Performing the majority of the logic in a relatively short period of time may contribute to the payment service provider 102 having an opportunity to interact with the payor 104 via one or more graphical user interfaces.

Once a payment request is received at the payment service provider 102, then the control unit 200 may initiate step 605. At step 605, the control unit 200 may determine whether or not the identified payee 325 in the payment request is a payee that is capable of receiving an electronic payment. If it is determined that the identified payee 325 is not capable of receiving an electronic payment, then the control unit 200 may go to step 610 and process the payment request according to a risk based method. An exemplary risk based method is described in U.S. Pat. No. 5,383,113, entitled "System and Method for Electronically Providing Customer Services Including Payment of Bills, Financial Analysis and Loans," which was filed on Jul. 25, 1991 and issued on Jan. 17, 1995.

The risk based processing of the payment request may involve the performance of risk analysis by the payment service provider 102 with respect to the requested payment. Risk analysis performed by the payment service provider 102 may determine whether an electronic or paper payment will be made by the payment service provider 102 based on one or more of various payment attributes such as, for example, a status of the payor 104 with the payment service provider 102 or the amount of the requested payment. For example, if a payor 104 has an active or good status with the payment service provider 102, then an electronic payment may be issued; if a payor 104 has an inactive or bad status with the payment service provider 102, then a paper payment may be issued; and, if a payor 104 has a pending or uncertain status with the payment service provider 102 (e.g., the payor 104 is a new payor), then a paper payment may be issued. As another example, if a payment request is for an amount below a predefined threshold amount such as, for example, $50.00, then an electronic payment may be issued. It will be understood that varying threshold amounts may be established for each payor 104 and/or payee 325. As yet another example, the risk based processing may involve the examination of one or more payor attributes such as the status of the payor and the payor payment history and one or more current payment attributes such as the payment amount.

Ultimately, a payment issued following risk based processing may be either a paper payment or an electronic payment. In the event that a payee 325 is not capable of receiving an electronic payment, such as in the situation described above, any payment issued by the payment service provider 102 may be a paper payment. The risk based processing may, however, determine the form of paper payment that is submitted to the payee 325. For example, the risk based processing may determine whether a payment is submitted to the payee 325 as a check or as a draft.

With reference back to FIG. 6, if it is determined at step 605 that the identified payee 325 is not capable of receiving an electronic payment, then the control unit 200 may go to step 615. At step 615, the control unit 200 may determine whether the payment request has been submitted within a window of time of at most the paper lead time from the due date of the payment. In other words, the control unit 200 may determine whether or not there is more than the paper lead time until the due date of the payment. For example, if the due date of a payment is 2 days away and the paper lead time for a payment is 4 days, then the payment request has not been submitted within the applicable window of time. However, if the due date of a payment is 5 days away and the paper lead time for a payment is 4 days, then the payment request has been submitted within the applicable window of time. The due date associated with a payment may be supplied to the payment service provider 102 by the payor 104 or by the identified payee 325 in conjunction with billing information. Alternatively, the due date may be determined by the payment service provider 102 based in part on prior payments submitted to the identified payee 325. For example, if a credit card bill associated with the payor 104 is due on the same day each month, then the payment service provider 102 may determine that the due date of a future bill will be on the same day of a future month.

If, at step 615, the control unit 200 determines that there is more than the paper lead time until the due date of the payment, then the control unit 200 may go to step 610 and process the payment request according to a risk based method. If, however, at step 615, the control unit 200 determines that the payment request was submitted within the paper lead time or less of the due date of the payment, then the control unit 200 may go to step 620.

At step 620, the control unit 200 may determine whether or not a payment has been previously submitted to the identified payee 325 on behalf of the payor 104. If the control unit 200 determines that a payment has not been previously submitted to the identified payee 325 on behalf of the payor 104, then the control unit 200 may go to step 610 and process the payment request according to a risk based method. If, however, the control unit 200 determines that a payment has been previously submitted to the identified payee 325 on behalf of the payor 104, then the control unit 200 may go to step 625.

At step 625, the control unit 200 may determine whether or not the last payment submitted to the identified payee 325 on behalf of the payor 104 was an electronic payment. If the last payment submitted to the identified payee 325 on behalf of the payor 104 was not an electronic payment, then the service provider 102 may go to step 610 and process the payment request according to a risk based method. If, however, the last payment submitted to the identified payee 325 on behalf of the payor 104 was an electronic payment, then the control unit 200 may go to step 630.

At step 630, the control unit 200 may determine whether or not there is any negative history associated with the payor 104. The control unit 200 may determine whether there is any negative history in the same manner as that previously described with reference to FIG. 5. If the control unit 200 determines that there is no negative history associated with the payor 104, then the control unit 200 may go to step 635. If, however, the control unit determines that there is negative history associated with the payor 104, then the control unit 200 may go to step 645.

At step 635, the control unit 200 may determine whether or not the monetary amount of the payment request exceeds a payment reversibility limit associated with the identified payee 325, if a payment reversibility limit has been established. A payment reversibility limit may be established by a reversibility agreement between a managed payee and the payment service provider 102. Accordingly, if the identified payee 325 is a managed payee, then a reversibility agreement may exist. The reversibility agreement may establish that the payment service provider 102 does not have to assume the risk of a failed payment if the payment amount is below a specified ceiling. Additionally, the reversibility agreement may establish that the payment service provider 102 does not have to assume the risk of a failed payment if the payment amount combined with the total amount of all other payments submitted to the identified payee 325 by the payment service provider 102 during a predetermined period of time is below a specified ceiling. For example, a reversibility limit of $5,000 may be established for a single payment submitted to the identified payee 325. As another example, a reversibility limit of $500,000 may be established for the total of all payments submitted to the identified payee 325 by the payment service provider 102 during a one month period of time. It will be understood that any monetary amount may be used for a reversibility ceiling and any period of time may be used for the predetermined period of time in a reversibility agreement. If a reversibility agreement is in place and the amount of a payment request does not extend beyond the ceiling(s) of the reversibility agreement, then the payment service provider 102 does not have to assume the risk of the payment because the identified payee 325 has agreed to provide funds to the payment service provider 102 in the amount of the payment request if the payment fails.

At step 635, if it is determined that the payment amount of the payment request exceeds a reversibility limit, then the control unit 200 may go to step 645. If, however, it is determined that the payment amount does not exceed a reversibility limit, then the control unit 200 may go to step 640. At step 640, the control unit 200 may force any payment submitted to the identified payee 325 by the payment service provider 102 to be an electronic payment. When a payment is forced, the payment service provider 102 may determine that no further payment processing is necessary for the payment and the determination of the method of payment may be final.

It will be understood by those of skill in the art that if no reversibility agreement is in place, the payment service provider 102 may process the payment request in several different ways at step 635. The payment service provider 102 may take an optimistic approach and assume that, since no flags have been raised so far that would require risk based processing, the payment may be made electronically. Accordingly, the control unit 200 of the payment service provider 102 may go to step 640 and force any payment submitted to the identified payee 325 by the payment service provider 102 to be an electronic payment. Alternatively, the payment service provider 102 may take a pessimistic approach and not permit an electronic payment to be submitted to the identified payee 325. Accordingly, if a pessimistic approach is taken in the absence of a reversibility agreement then the control unit 200 may go to step 645. It will be appreciated that, if no reversibility agreement is in place, the payment service provider 102 may make a determination as to whether the payment service provider 102 is willing to accept the risk of electronic payment submitted to a payee on behalf of the payor 104, as described in greater detail below.

At step 645, the control unit 200 may once again determine whether the payment request was submitted within a window of less than the paper lead time from the payment due date. If it has been determined that a paper payment is the proper form of payment, then the control unit 200 may determine at step 645 whether or not there is enough time to accommodate the paper payment prior to the due date of the payment. If there is not enough time to accommodate the paper payment, then the control unit 200 may inform the payor 104 and determine whether or not the payor 104 wishes or desires to proceed with the payment request. At step 645, if the control unit 200 determines that the payment request was submitted within a window of less than the paper lead time from the payment due date, then the control unit 200 may go to step 650. If, however, the control unit 200 determines that the window to the payment due date is at least equal to the paper lead time, then the control unit 200 may go to step 655. At step 655, the control unit 200 may force any payment submitted to the identified payee 325 by the payment service provider 102 to be a paper payment.

At step 650, the control unit 200 may inform the payor 104 that any payment issued by the payment service provider 102 may not reach the identified payee 325 until after the due date associated with the payment. The control unit 200 may ask the payor 104 whether or not the payor 104 would like to proceed with the payment. If the payor 104 is still engaged in a communications session with the payment service provider 102, then the control unit 200 may transmit a message or a prompt over the Internet that the payor 104 must respond to in order for a payment to be made. If the payor 104 wishes to proceed with the payment, then the control unit 200 may go to step 655 and force any payment submitted to the identified payee 325 to be a paper payment. If, however, the payor 104 does not wish to proceed with the payment, then the control unit 200 may go to step 660 and abandon the current payment request. It will be understood that, if the payor 104 is not still engaged in a communications session with the payment service provider 102, then the payment service provider 102 may store a message or indication for the payor 104 to retrieve or access later. Additionally, the payment service provider 102 may transmit or communicate a message to the payor 104 by any suitable means such as, for example, by e-mail.

It also will be understood by those of skill in the art that the steps performed by the control unit 200 during its operation, as shown in FIGS. 4-6 do not necessarily have to be performed in the order set forth in the logic of FIGS. 4-6 but instead may be performed in any suitable order. It will also be understood that certain steps described above with reference to FIGS. 4-6 need not necessarily be performed and/or additional steps may be performed in accordance with the present invention.

It will further be understood that the determination of whether an electronic or paper payment will be submitted to an identified payee 325 in accordance with the present invention may depend on a wide variety of payment attribute factors. One or more of these payment attribute factors may be analyzed independently or in combination with one another in making the determination of the form of payment. Only some of those factors are discussed above with reference to FIGS. 5-6. The payment attributes utilized in the determination may relate to the payment service provider 102, the payor 104, and/or to the identified payee 325. If another entity such as, for example, a sponsor is utilized in accordance with the present invention, it will be understood that payment attributes may relate to the another entity. Each payment attribute may be monitored by the payment service provider 102 for a predetermined period of time such as, for example, the previous month, previous six months, or previous year. It will be understood that the monitoring periods for each payment attribute may be any period of time, and the monitoring period of one payment attribute may or may not be the same as the monitoring period of another payment attribute. An example of a payment attribute relating to the payment service provider 102 may be the rate of electronic payment failures associated with the payment service provider 102. Another example may be the rate of electronic payment failures submitted by the payment service provider 102 to a particular identified payee 325 or group of identified payees. If the rate of electronic payment failures is below a predetermined threshold percentage, then an electronic payment may be permitted. In the present application, a rate may be a ratio of a particular subset of total payments to the total payments, expressed as a percentage. For example, the rate of electronic payment failures associated with the payment service provider 102 may be the ratio of failed payments submitted by the payment service provider 102 to the total payments submitted by the payment service provider 102, expressed as a percentage.

Examples of payment attributes relating to a payor 104 include, but are not limited to, the rate of electronic payment failures associated with the payor 104, the payment history of the payor 104, and payor characteristics or a special payor status associated with the payor 104. If the rate of electronic payment failures associated with the payor 104 is below a predetermined threshold percentage, then an electronic payment may be permitted. The rate of electronic payment failures associated with the payor 104 may encompass the rate of electronic payment failures submitted on behalf of the payor 104 by the payment service provider 102. The payment history of the payor 104 may include data associated with past payments of the payor 104 that may be monitored by the control unit 200. Data included in the payment history may include the average (mean), median, and/or mode payment amount of payments made by the payor 104. Average payment amounts may be monitored for all payees or for a subset of payees such as, for example, the managed payees. If the average payment amount is below a predetermined threshold value, then an electronic payment may be permitted. Payor characteristics or a special payor status associated with the payor 104 may be used to identify payors for which the payment service provider 102 is willing to assume a certain amount of risk in submitting payments. For example, valued customers or users of the payment service provider 102 may be permitted to submit all payments electronically that are capable of being made electronically. The determination of a special status may be based on the payment history of the payor 104 with the payment service provider 102 or on other payment attributes such as a credit rating of the payor 104, the annual income or household income of the payor 104, or the geographic location or zip code in which the payor 104 resides.

Examples of payment attributes relating to an identified payee 325 include, but are not limited to, a reversibility ceiling associated with the identified payee 325, the percentage of payments that have been above the reversibility ceiling, the rate of electronic payment failures associated with the identified payee 325, the payment history of the identified payee 325, and characteristics or a special payee status of the identified payee 325. The reversibility ceiling associated with the identified payee 325 may be established by a reversibility agreement between the payment service provider 102 and the identified payee 325, as described above with reference to FIG. 6. In association with the reversibility limit, the payment service provider 102 may keep track of the rate of payments submitted to the identified payee 325 that are above the reversibility limit. If this rate is below a predetermined threshold percentage, then an electronic payment may be permitted. Additionally, similar to the payment service provider 102 and the payor 104, the rate of failed electronic payments associated with the identified payee 325 may be monitored by the payment service provider 102. If the rate of failed electronic payments is below a predetermined threshold percentage, then an electronic payment may be permitted by the payment service provider 102. The rate of failed electronic payments associated with the identified payee 325 may encompass the rate of failed electronic payments that have been submitted to the identified payee 325 by the payment service provider 102. As an example of payment attribute factors that are analyzed in combination or in conjunction with one another, the rate of payments that are above the reversibility limit may be analyzed in combination with the rate of failed electronic payments. For example, if there is an appreciable number of payments over the reversibility limit, but the rate of failed electronic payments is low, then an electronic payment may be permitted by the payment service provider 102. Additionally, as explained in greater detail below with respect to conflicts among payment attributes, the same result may be reached if the rate of failed electronic payments is assigned a higher priority than the rate of payments that are above the reversibility limit.

Similar to a payor 104, an identified payee 102 may also have a payment history and or characteristics or a special payee status with the payment service provider 102. The payment history of the identified payee 325 may include data associated with past payments submitted to the identified payee 325 that may be monitored by the control unit 200. Data included in the payment history may include the average (mean), median, and/or mode payment amount of payments made to the identified payee 325. If the average payment amount is below a predetermined threshold value, then an electronic payment may be permitted. An identified payee 325 may also have characteristics or a special payee status associated with it. The payee characteristics may be used to identify payees such as, for example, managed payees, for which the payment service provider 102 is willing to assume a certain amount of risk in submitting payments. Accordingly, the payment service provider 102 may be willing to submit all payments to certain payees as electronic payments. An example of a payee characteristics that may be examined or considered is the classification of a payee. The payment service provider 102 may determine whether an identified payee 325 falls into a certain category such as, for example, a utility company, a credit card issuer, a loan issuer, a retailer, or some other payee category. As an example of a situation in which the payment service provider 102 may be willing to assume the risk of an electronic payment, the payment service provider 102 may be willing to submit all payments to a utility company as electronic payments because these payments are typically small and typically have few electronic debit failures. In contrast payments to a loan issuer may be riskier due to higher average payment amounts and payments to a retailer may be riskier to higher rates of fraud associated with retail transaction. Accordingly, the payment service provider 102 may not be willing to submit all payments to a loan issuer or retailer as electronic payments.

Many different payment attributes are set forth above that relate to the determination of whether a payment will be submitted as an electronic or a paper payment. Conflicts might arise if more than one payment attribute is used in the determination. Accordingly, it will be understood that a multitude of different priorities and processing rules may be assigned to the different payment attributes in order to resolve conflicts. For example, each of the payment attributes may be assigned a priority order and a payment attribute with a higher priority may trump a payment attribute with a lower priority. As another option, if the payment attributes are assigned a priority order, then the payment service provider 102 may examine the payment attributes in order and determine a payment method based in either an optimistic or a pessimistic manner. For an optimistic determination, the payment service provider 102 may examine the payment attributes in order until a payment attribute suggests that an electronic payment should be submitted. At that time, the examination of the payment attributes may cease and the payment service provider 102 may set the payment method to an electronic payment. For a pessimistic determination, the payment service provider 102 may examine the payment attributes in order until a payment attribute suggests that a paper payment should be submitted. At that time, the examination of the payment attributes may cease and the payment service provider 102 may set the payment method to a paper payment. As another alternative, the payment service provider 102 may examine all of the payment attributes and decide on a payment method based on whether more payment attributes suggest an electronic payment or more payment attributes suggest a paper payment. In this type of analysis, the payment attributes may be weighted or all examined equally. Many other methods for resolving conflicts among the payment attributes will be apparent to those of ordinary skill in the art.

Although the present invention is intended to minimize negative payor experiences with the payment service provider 104, it will be understood that all negative payor experiences may not be eliminated by the present invention. As an example, a situation might exists in which a payor 104 has satisfied all of the requirements for submitting an electronic payment except that the reversibility limit for the identified payee 325 has been exceeded. The expected payment delivery time displayed to the payor 104 prior to receiving a payment request may indicate a delivery time associated with an electronic payment. Additionally, the payor 104 may be accustomed to submitting electronic payments to the identified payee 325. Accordingly, the payor 104 might not submit a payment request to the payment service provider 102 until a point in time in which a paper payment may not reach the identified payee 325 until after the due date of the payment; however, an electronic payment would reach the identified payee 325 prior to or on the due date of the payment. In this situation, a negative payor experience might occur if the payor 104 is accustomed to making electronic payments but is unable to do so. This type of situation may be avoided by the payment service provider 102 if the payment service provider 102 is willing to accept a certain amount of risk for the payor 104. For example, if the payor 104 is a valued customer or user of the payment service provider 104 and there is no negative history associated with the payor 104, then the payment service provider 102 may be willing to accept the risk of an electronic payment, thereby avoiding a negative payor experience.

As shown in FIG. 6, an optional step 665, which is displayed in dashed lines, may be included to determine whether or not the payment service provider 102 is willing to accept the risk of an electronic payment if the reversibility limit has been exceeded. If it is determined at step 635 that the reversibility limit has been exceeded, then the control unit 200 may go to step 665 and determine whether or not the risk of electronic payment will be accepted by the payment service provider 102. If the payment service provider 102 is willing to accept the risk of an electronic payment, then the control unit 200 may go to step 640 and force the payment to be issued electronically. If, however, the payment service provider 102 is not willing to accept the risk of an electronic payment, then the control unit 200 may go to step 645.

Another situation in which a negative payor experience might occur also involves a payor 104 that is accustomed to having electronic payments submitted to an identified payee 102. Because several payments in a row are submitted electronically, each time the payor 104 identifies a payee for the payment service provider 102, an expected electronic payment delivery time is displayed to the payor 104. However, the payor 104 may submit a payment request that allows ample time for risk based payment processing. Because the risk based payment processing may take other factors into account, the payment may ultimately be issued in paper form. The next time the payor 104 identifies the payee to the payment service provider 102, an expected paper delivery time may be displayed to the payor 104. This may cause a negative payor experience if the payor 104 is accustomed to having electronic payments submitted and does not access the system to submit a payment to the payee 325 until a point in time at which only an electronic payment would reach the identified payee 325 prior to the due date associated with the payment. These types of problems may be mitigated if the payment service provider 102 also engages in bill presentment for the payee 325. If the payment service provider 102 is aware of the due date of the payment which might occur, for instance, in a situation in which the payment service provider 102 has received billing information from the identified payee 325, then the payment service provider 102 may be able to transmit or communicate a notification message to the payor 104 informing them that a payment request needs to be sent by a certain time (taking into account the modified lead time) in order to ensure that the payment will reach the identified payee 325 prior to the due date. As another example, the payment service provider 102 may determine or estimate a due date of a payment by analyzing the payment history of the payor 104. Messages sent to the payor 104 may be e-mail messages, telephone messages, or any other type of electronic or non-electronic message or communication. For example, if the payment service provider 102 has stored information that indicates that a payment is due on May 15, and the payment service provider 102 has stored information that indicates that the next payment to the payee 325 will be submitted as a paper payment then the payment service provider 102 may send an e-mail message to the payor 104 indicating that a payment request needs to be received by May 11 in order to ensure that a payment will reach the payee 325 prior to May 15.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    identifying, by a service provider, a payee associated with a payor, wherein the payee is capable of receiving both a paper payment type and an electronic payment type, and wherein a payment type for a payment to the payee on behalf of the payor is not determined until after a payment request associated with the payment is received:
    determining, by the service provider prior to receiving the payment request, an expected payment delivery time for the payment based on a plurality of payment attributes comprising at least one payment attribute associated with the payee and at least one payment attribute associated with the payor, wherein the at least one payment attribute associated with the payor comprises at least one of an attribute associated with past payments of the payor or a special status associated with the payor, and
    transmitting, by the service provider for presentation to the payor, an indicator associated with the determined expected payment delivery time,
    wherein the above steps are performed by one or more computers associated with the service provider.

2. The method of claim 1, wherein transmitting the expected payment delivery time to the payor comprises transmitting the expected payment delivery time to the payor as part of a graphical user interface.

3. The method of claim 1, wherein the at least one payment attribute associated with the payee includes at least one of (i) an electronic payment acceptance status of the payee, (ii) a reversibility ceiling of the payee, (iii) a rate of electronic payment failures to the payee, (iv) an average payment amount of payments to the payee, (v) a statistical function of payments made to the payee, (vi) a payment history associated with the payee, or (vii) a status of the payee.

4. The method of claim 1, wherein the at least one payment attribute associated with the payor further includes at least one of (i) an electronic payment status of the payor for the payee, (ii) a rate of electronic payment failures of the payor, (iii) the average payment amount of payments made by the payor, (iv) a statistical function of payments made by the payor, or (v) a history of a payments made on behalf of the payor by the service provider.

5. The method of claim 1, wherein the determination of the expected payment delivery time is further based on at least one payment attribute associated with the service provider, wherein the service provider is configured to submit a payment to the payee on behalf of the payor.

6. The method of claim 5, wherein the at least one payment attribute associated with the service provider comprises a rate of electronic payment failures of payments made by the service provider for a predefined scope.

7. The method of claim 6, wherein the predefined scope includes one of all the payments made by the service provider during a predefined period of time or the payments made by the service provider to the payee during a predefined period of time.

8. The method of claim 1, wherein the expected payment delivery time is associated with a predicted payment type.

9. The method of claim 8, wherein the predicted payment type is one of an electronic payment or a paper payment.

10. The method of claim 1, further comprising:
    receiving the payment request from the payor to remit the payment to the payee on behalf of the payor;
    determining, based on at least one condition, whether to perform at least one of (i) fulfilling the payment request via an electronic payment to the payee, (ii) fulfilling the payment request via a paper payment to the payee, or (iii) performing additional risk processing on the payment request in order to determine a payment type; and
    completing processing of the payment request in accordance with the determination.

11. The method of claim 10, wherein the at least one condition is one of (i) an electronic payment acceptance status of the payee, (ii) a determination of whether a time until the due date of the payment is within a predetermined time window, (iii) a determination of whether a previous payment has been submitted to the payee on behalf of the pay or, (iv) a determination of whether a last payment submitted to the payee on behalf of the pay or was an electronic payment, (v) a determination of whether the payor has a negative history, or (vi) a determination of whether a reversibility ceiling associated with the payee has been exceeded.

12. The method of claim 11, wherein the predetermined time window is an expected delivery time for a paper payment to reach the payee.

13. The method of claim 10, wherein it is determined that the payment request is to be fulfilled via a paper payment to the payee, and completing processing of the payment request comprises:
    submitting a draft payment to the payee on behalf of the payor.

14. The method of claim 10, wherein it is determined that the payment request is to be fulfilled via a paper payment to the payee, and completing processing of the payment request comprises:
    determining that the time until the due date of the payment is less than a paper payment delivery time; and
    selecting one of (i) abandoning the payment request or (ii) submitting a paper payment to the payee on behalf of the payor.

15. The method of claim 14, wherein the selection is based on a choice made by the payor.

23

16. The method of claim 10, wherein it is determined that additional risk processing is to be performed on the payment request, and completing processing of the payment request comprises:
- performing a risk analysis on the payment request;
- determining, based at least in part on the risk analysis, whether the payment request will be fulfilled via an electronic payment or a paper payment;
- submitting an electronic payment to the payee on behalf of the payor if it is determined that the payment request will be fulfilled via an electronic payment; and
- submitting a paper payment to the payee on behalf of the payor if it is determined that the payment request will be fulfilled via a paper payment.

17. The method of claim 16, wherein performing a risk analysis on the payment request comprises analyzing at least one of (i) a status of the payor, or (ii) an amount associated with the payment request.

18. The method of claim 1, wherein identifying a payee associated with a payor comprises:
- receiving billing information associated with a bill from a biller for the payor; and
- identifying the payee based at least in part on the received billing information.

19. A system comprising:
- a processor configured (i) to determine, prior to receiving a payment request to pay a payee on behalf of a payor, an expected payment delivery time for the payment request based on a plurality of payment attributes comprising at least one payment attribute associated with the payee and at least one payment attribute associated with the payor, wherein the at least one payment attribute associated with the payor comprises at least one of an attribute associated with past payments of the payor or a special status associated with the payor, wherein the payee is capable of receiving both a paper payment type and an electronic payment type, and wherein a payment type for a payment to the payee is not determined until after the payment request is received; and
- a network interface configured to transmit an indicator associated with the expected payment delivery time to the payor.

20. The system of claim 19, wherein the at least one payment attribute associated with the payee includes at least one of (i) an electronic payment acceptance status of the payee, (ii) a reversibility ceiling of the payee, (iii) a rate of electronic payment failures to the payee, (iv) an average payment amount of payments to the payee, (v) a statistical function of payments made to the payee, (vi) a payment history associated with the payee, or (vii) a status of the payee.

21. The system of claim 19, wherein the at least one payment attribute associated with the payor further includes at least one of (i) an electronic payment status of the payor for the payee, (ii) a rate of electronic payment failures of the payor, (iii) the average payment amount of payments made by the payor, (iv) a statistical function of payments made by the payor, or (v) a history of payments made on behalf of the payor by a payment service provider.

22. The system of claim 19, wherein the processor is associated with a payment service provider and the determination of the expected payment delivery time is further based on at least one payment attribute associated with the payment service provider.

23. The system of claim 22, wherein the at least one payment attribute associated with the payment service provider comprises a rate of electronic payment failures of payments made by the payment service provider for a predefined scope.

24

24. The system of claim 23, wherein the predefined scope includes one of all the payments made by the payment service provider during a predefined period of time or the payments made by the payment service provider to the payee during a predefined period of time.

25. The system of claim 19, wherein the expected payment delivery time is associated with a predicted payment type.

26. The system of claim 25, wherein the predicted payment type is one of an electronic payment or a paper payment.

27. The system of claim 19, wherein the processor is further configured to:
- receive the payment request from the payor to remit the payment to the payee on behalf of the payor;
- determine, based on at least one condition, whether to (i) fulfill the payment request via an electronic payment to the payee, (ii) fulfill the payment request via a paper payment to the payee, or (iii) perform additional risk processing on the payment request in order to determine a payment type; and
- complete processing of the payment request in accordance with the determination.

28. The system of claim 27, wherein the at least one condition is one of (i) an electronic payment acceptance status of the payee, (ii) a determination of whether a time until the due date of the payment is within a predetermined time window, (iii) a determination of whether a previous payment has been submitted to the payee on behalf of the payor, (iv) a determination of whether a last payment submitted to the payee on behalf of the payor was an electronic payment, (v) a determination of whether the payor has a negative history, or (vi) a determination of whether a reversibility ceiling associated with the payee has been exceeded.

29. The system of claim 28, wherein the predetermined time window is an expected delivery time for a paper payment to reach the payee.

30. The system of claim 27, wherein it is determined that the payment request is to be fulfilled via a paper payment to the payee, and the processor completes processing of the payment by submitting a draft payment to the payee on behalf of the payor.

31. The system of claim 27, wherein it is determined that the payment request is to be fulfilled via a paper payment to the payee, and the processor completes processing of the payment request by:
- determining that the time until the due date of the payment is less than a paper payment delivery time; and
- selecting one of (i) abandoning the payment request or (ii) submitting a paper payment to the payee on behalf of the payor.

32. The system of claim 31, wherein the selection is based on a choice made by the payor.

33. The system of claim 27, wherein it is determined that additional risk processing is to be performed on the payment request, the processor completes processing of the payment request by:
- performing a risk analysis on the payment request;
- determining, based at least in part on the risk analysis, whether the payment request will be fulfilled via an electronic payment or a paper payment;
- submitting an electronic payment to the payee on behalf of the payor if it is determined that the payment request will be fulfilled via an electronic payment; and
- submitting a paper payment to the payee on behalf of the payor if it is determined that the payment request will be fulfilled via a paper payment.

34. The system of claim 33, wherein performing a risk analysis on the payment request comprises analyzing at least one of (i) a status of the payor, or (ii) an amount associated with the payment request.

35. The system of claim 19, wherein, prior to determining the expected payment delivery time, the processor is further configured to identify the payee associated with the payor by:
  receiving billing information associated with a bill from a biller for the payor; and
  identifying the payee based at least in part on the received billing information.

36. A system comprising:
  means for identifying a payee associated with a payor, wherein the payee is capable of receiving both a paper payment type and an electronic payment type, and wherein a payment type for a payment to the payee on behalf of the payor is not determined until after a payment request associated with the payment is received;
  means for determining, by a service provider prior to receiving the payment request, an expected payment delivery time for a payment to fulfill the payment request based on a plurality of payment attributes comprising at least one payment attribute associated with the payee and at least one payment attribute associated with the payor, wherein the at least one payment attribute associated with the payor comprises at least one of an attribute associated with past payments of the payor or a special status associated with the payor; and
  means for transmitting an indicator associated with the expected payment delivery time to the payor.

37. A method comprising:
  identifying, by a service provider, a payee associated with a payor, wherein the payee is capable of receiving both a paper payment type having an associated paper lead time for receiving the paper payment type and an electronic payment type having an associated electronic lead time for receiving the electronic payment type;
  determining, by the service provider, an expected payment delivery time for the payee based on a plurality of payment attributes comprising at least one payment attribute associated with the payee and at least one payment attribute associated with the payor, wherein the least one payment attribute associated with the payor comprises at least one of an attribute associated with past payments of the payor or a special status associated with the payor, and wherein the expected payment delivery time is determined to be the electronic lead time;
  transmitting, by the service provider for presentation to the payor subsequent to determining the expected payment delivery time, an indicator associated with the determined expected payment delivery time;
  receiving, by the service provided subsequent to transmitting the indicator, a payment request to pay the payee on behalf of the payor;
  processing, by the service provider, the payment request to determine a payment method for fulfilling the payment request, wherein the determined payment method comprises one of (i) the paper payment type or (ii) the electronic payment type;
  directing, by the service provider, a payment to the payee on behalf of the payor by the determined payment method if (i) the determined payment method is the electronic payment type or (ii) the determined payment method is the paper payment type and the paper lead time is less than a time until a due date associated with the payment request; and
  executing, by the service provider, an exception handling process if the determined payment method is the paper payment type and the paper lead time is greater than the time until the due date associated with the payment request,
  wherein the above steps are performed by one or more computers associated with the service provider.

* * * * *

UNITED STATES PATENT AND TRADEMARK OFFICE
CERTIFICATE OF CORRECTION

PATENT NO.         : 7,702,585 B2
APPLICATION NO.    : 11/565322
DATED              : April 20, 2010
INVENTOR(S)        : Lyda et al.

It is certified that error appears in the above-identified patent and that said Letters Patent is hereby corrected as shown below:

Column 21, Line 39 – Change ":" to --;--

Column 21, Line 48 – Change "," to --;--

Signed and Sealed this

First Day of June, 2010

David J. Kappos
*Director of the United States Patent and Trademark Office*